(12) United States Patent
    Kass (10) Patent No.: US 8,881,035 B2
(45) Date of Patent: Nov. 4, 2014

(54) RENDERING DYNAMIC CONTENTS WITH STATIC FILE BASED GRAPHICAL USER INTERFACE FORM CONTROL

(75) Inventor: Eric Kass, Mannheim (DE)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 13/289,165

(22) Filed: Nov. 4, 2011

(65) Prior Publication Data
    US 2012/0124493 A1    May 17, 2012

(30) Foreign Application Priority Data
    Nov. 16, 2010    (EP) .................................... 10191367

(51) Int. Cl.
    *G06F 3/00*     (2006.01)
    *G06F 17/30*    (2006.01)
(52) U.S. Cl.
    CPC ............................ *G06F 17/30905* (2013.01)
    USPC ............................ 715/762; 715/700; 715/764

(58) Field of Classification Search
    USPC .................. 715/700, 733, 760, 762, 764, 765
    See application file for complete search history.

(56) References Cited

U.S. PATENT DOCUMENTS

| | | | |
|---|---|---|---|
| 7,536,389 B1 | 5/2009 | Prabhakar et al. | |
| 7,774,412 B1 * | 8/2010 | Schnepel | 709/206 |
| 2007/0143697 A1 | 6/2007 | Muller et al. | |
| 2008/0098300 A1 | 4/2008 | Corrales et al. | |
| 2013/0198608 A1 * | 8/2013 | Krassner et al. | 715/234 |

* cited by examiner

*Primary Examiner* — Xiomar L Bautista
(74) *Attorney, Agent, or Firm* — James R. Nock (57) ABSTRACT

The invention provides a method for rendering dynamic web contents with static file based graphical user interface (GUI) form control The method includes the steps of trapping an event which requires to draw or redraw an image in a file based GUI image control in a current local environment; initiating a WebCrawler function with parameters derived from the current local environment to retrieve data from the web; generating a locally accessible file with web content in a format interpretable by the file based GUI image control; and having the file based GUI image control render the web content contained in the locally accessible file.

7 Claims, 8 Drawing Sheets

Product

Tuesday, March 23, 2010
3:07::39 PM

| ProductID | Description | Image |
|---|---|---|
| 427819 | abc | |
| 428093 | fghi | |
| 851453 | klmno | |
| 721009 | xyz | |

Product

Tuesday, March 23, 2010
3:07::39 PM

| ProductID | Description | Image |
|-----------|-------------|-------|
| 427819 | abc |  |
| 428093 | fghi |  |
| 851453 | klmno |  |
| 721009 | xyz |  |

Fig. 1 c

```
Public Function LoadPicture()

┌ rem ─────────────────────────────
       │ rem ──── Get ProductID from Form ────
S20 ───┤ rem ─────────────────────────────
       │ Dim ProductID As String
       └ ProductID = Reports.Item("Product Report").Controls("ProductID").Value ┌ rem ─────────────────────────────
       │ rem ──── Create File Name from ProductID ────
S22 ───┤ rem ─────────────────────────────
       │ Dim PictureFile As String
       └ PictureFile = ProductID + ".jpg"

┌ rem ─────────────────────────────
       │ rem ──── Download Picture from Web ────
       │ rem ─────────────────────────────
S24 ───┤ Dim WebCrawler As String
       │ WebCrawler = "WebCrawler.exe " + ProductID + " " + PictureFile
       │ RetVal = ExecCmd(WebCrawler, vbHide)
       │
       └ LoadPicture = Picture End Function
```

Fig. 2 a

```
Public Function LoadPhoto()
```

S30
```
Rem ─────────────────────
Rem ──── Get Persons Name from Form ────
Rem ─────────────────────
LastName = Forms.Item("FormPhoto").Controls("Last").Value
FirstName = Forms.Item("FormPhoto").Controls("First").Value
```

S32
```
Rem ─────────────────────
Rem ──── Construct PhotoFilename ────
Rem ─────────────────────
PhotoFilename = FirstName + LastName + ".jpg"
```

S34
```
Rem ─────────────────────
Rem ──── Download Picture from Web ────
Rem ─────────────────────
Dim PhonePROGRAM As String
PhonePROGRAM = "WebCrawler.exe -p" + PhotoFilename
PhonePROGRAM = PhonePROGRAM + " " + FirstName + " " + LastName
RetVal = Shell(PhonePROGRAM, vbHide)
```

S36
```
Rem ─────────────────────
Rem ──── Refresh Timer Event ────
Rem ─────────────────────
Forms.Item("FormPhoto").OnTimer = "= RefreshPhoto()"
Forms.Item("FormPhoto").TimerInterval = 1000
```

```
LoadPhoto = PhotoFilename

End Function

Public Function RefreshPhoto()
```

S38
```
Rem ─────────────────────
Rem ──── Cancel Refresh Event ────
Rem ─────────────────────
Forms.Item("FormPhoto").TimerInterval = 0
```

S40
```
Rem ─────────────────────
Rem ──── Construct PhotoFilename ────
Rem ─────────────────────
LastName = Forms.Item("FormPhoto").Controls("Last").Value
FirstName = Forms.Item("FormPhoto").Controls("First").Value
PhotoFilename = FirstName + LastName + ".jpg"
```

S42
```
Rem ─────────────────────
Rem ──── "Refresh" Control by "Touching" the Picture ────
Rem ─────────────────────
On Error Resume Next
Forms.Item("FormPhoto").Controls("Photo").Picture = PhotoFilename
```

```
End Function
```

Fig. 2 b

```
Public Function LoadPhoto()
    Rem ─────────────────────────
    Rem ──── Construct PhotoFilename ────
    Rem ─────────────────────────
S50 LastName = Forms.Item("FormPhoto").Controls("Last").Value
    FirstName = Forms.Item("FormPhoto").Controls("First").Value
    PhotoFilename = FirstName + LastName + ".jpg"

Rem ─────────────────────────
    Rem ──── Download Picture from Web ────
    Rem ─────────────────────────
S52 Dim PhonePROGRAM As String
    PhonePROGRAM = "WebCrawler.exe -p" + PhotoFilename
    PhonePROGRAM = PhonePROGRAM + " " + FirstName + " " + LastName
    hProcess = CreateProcess(PhonePROGRAM)

Rem ─────────────────────────
    Rem ──── Monitor Timer Event ────
    Rem ─────────────────────────
S54 Forms.Item("FormPhoto").OnTimer = "= MonitorPhoto(" + Str(hProcess) + ")"
    Forms.Item("FormPhoto").TimerInterval = 100

LoadPhoto = PhotoFilename
End Function

Public Function MonitorPhoto(hProcess)
    Rem ─────────────────────────
    Rem ──── Check WebCrawler Process ────
    Rem ─────────────────────────
    RetVal = WaitForSingleObject(hProcess,0)
S56 If RetVal = 258 Then
        Forms.Item("FormPhoto").TimerInterval = 100
        GoTo Done
    End If
    Forms.Item("FormPhoto").TimerInterval = 0
    CloseHandle(hProcess)

Rem ─────────────────────────
    Rem ──── Construct PhotoFilename ────
    Rem ─────────────────────────
S58 LastName = Forms.Item("FormPhoto").Controls("Last").Value
    FirstName = Forms.Item("FormPhoto").Controls("First").Value
    PhotoFilename = FirstName + LastName + ".jpg"

Rem ─────────────────────────
    Rem ──── Have Control Render Photo ────
    Rem ─────────────────────────
    On Error GoTo NoPhoto
S60 Forms.Item("FormPhoto").Controls("Photo").Picture = PhotoFilename
    GoTo Done
NoPhoto:
    Forms.Item("FormPhoto").Controls("Photo").Picture = DefaultPhoto
Done:
End Function
```

RENDERING DYNAMIC CONTENTS WITH STATIC FILE BASED GRAPHICAL USER INTERFACE FORM CONTROL

FIELD OF THE INVENTION

The invention relates to the field of graphical user interface (GUI) controls and more particularly to a method and a system for rendering dynamic contents with static file based graphical user interface form control.

BACKGROUND OF THE INVENTION

The conventional graphical user interface (GUI) has been widely used for many years. The primary function of the GUI includes providing visual controls with which the end-user can interact with an underlying application. Though the common GUI includes many stock visual controls, a select few visual controls can be combined to accommodate most computer-human interactions required by an application. For example, the static text box control can be used to present text to the end-user while an edit box can permit the user to provide textual input to the application. A radio button control can provide for the exclusive selection of an element from among a field of elements, while a checklist box can control can provide for the non-exclusive selection of elements from among a field of elements.

US 2007/0143697 A1 discloses a method for displaying dynamic graphical content in GUI controls. A set of user interface controls and control data include a set of cumulative selection metrics for each user interface control in the set. Each user interface, in turn, can include a label and an indicator of cumulative metrics for the user interface control. For instance, the set of user interface controls can include a set of radio buttons in a radio button control group, a set of check boxes in a check box control group or the like.

A GUI based image control used in forms on a computer displays images residing in files in the local file system. Usually, the image control has a control source property which contains the name of the image file to be loaded from the local file system.

SUMMARY OF THE INVENTION

The present invention provides an improved method for rendering dynamic contents with a static file based graphical user interface.

The present invention further provides a system for rendering dynamic contents with a static file based Graphical User Interface More specifically, the present invention provides a method for rendering dynamic web contents with static file based graphical user interface (GUI) form control. The method includes the steps of:

trapping an event which requires to draw or redraw an image in a file based GUI image control in a current local environment;

initiating a WebCrawler function with parameters derived from the current environment to retrieve data from the web;

generating a locally accessible file with web content in a format interpretable by the file based GUI image control;

having the file based GUI image control render the web content.

While the image control according to prior art only accesses the local file system and has no ability to search and display images stored on the internet, the inventive method provides access to content of the internet which is very efficient for saving storage space. Advantageously, the method provides dynamic web-content to static file and/or data controls using existing GUI based programming frameworks and prior-art WebCrawler technology. The invention discloses how to acquire web content synchronously and asynchronously and have the GUI render this dynamic content using existing static content based controls.

According to the invention, a WebCrawler function can be used to dynamically search and download images from the internet each time the image control attempts to load an image file to display.

As any visual basic control property, the picture property can invoke a user defined function to retrieve the filename of the image to display. This invention disclosure describes a function that not only returns the filename for the image control to display, but invokes a WebCrawler function to search and acquire an image from the internet and store it in a local file (cache) for the image control or data control to render.

Rendering is the process whereby data representing an image is converted to a human recognizable entity and displayed by way of a computer monitor or "printed" to a device or file.

According to an embodiment of the invention, the event comprises at least one of:

trapping a filename request related to a rendering event of the file based GUI image control;

trapping a before-render event of a file based GUI image control;

trapping a before render event of the form hosting a file based GUI image control.

A "before-render event" can be best understood in the following way. The operating system or application hosting a GUI form will invoke defined functions of the application at certain times so that the application is aware of specific situations ("events"). For instance, in Microsoft windows, an application is notified of GUI "events" (e.g., button press) when the operating system sends messages to an application message queue. The application typically handles message "events" by calling application supplied functions ("Event Handlers") to perform defined tasks.

In general, the image control needs an indication to know when to invoke the WebCrawler (and subsequently render the result). A "Begin WebCrawler function" can be assigned as an "Event Handler" to any event that the application programmer using the image control finds appropriate such that the image is rendered at least when needed.

Further, the method may include that after the WebCrawler function is completed, synchronously returning process control back to the GUI control to have it rendering the file.

The method may also include scheduling a timed asynchronous request to have the GUI control rendered after a specific period of time.

According to another embodiment, it may be asynchronously monitored whether the WebCrawler function is completed and subsequently request to have the GUI control rendered. Preferably, it may by subsequently requested to have the GUI control rendered.

According to another aspect of the invention, a computer program product comprises a computer useable medium including a computer readable program code for rendering dynamic web content with static file based GUI form protocol, wherein the computer useable program code comprises computer usable program code for:

trapping an event which requires to draw or redraw an image in a file based GUI image control in a current local environment;

initiating a WebCrawler function with parameters derived from the current environment to retrieve data from the web;

generating a locally accessible file with web content in a format interpretable by the file based GUI image control;

having the file based GUI image control render the web content contained in the locally accessible file.

According to another aspect of the invention, a data processing system for execution of a data processing program comprises software code portions for performing a method when said program is run on said data processing system, comprising the steps:

trapping an event which requires to draw or redraw an image in a file based GUI image control in a current local environment;

initiating a WebCrawler function with parameters derived from the current environment to retrieve data from the web;

generating a locally accessible file with web content in a format interpretable by the file based GUI image control;

having the file based GUI image control render the web content contained in the locally accessible file.

According to another aspect of the invention, a data processing program is executes in a data processing system comprising software code portions for performing a method when said program is run on a computer, wherein the method steps are trapping an event which requires to draw or redraw an image in a file based GUI image control in a current local environment;

initiating a WebCrawler function with parameters derived from the current environment to retrieve data from the web;

generating a locally accessible file with web content in a format interpretable by the file based GUI image control;

having the file based GUI image control render the web content contained in the locally accessible file.

BRIEF DESCRIPTION OF THE DRAWINGS

The present invention together with the above-mentioned and other objects and advantages may best be understood from the following detailed description of the embodiments, but not restricted to the embodiments, wherein is shown in.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF EXAMPLE EMBODIMENTS

The internet is a worldwide system of computer networks and represents a public, self-sustaining facility that is accessible to tens of millions of people worldwide. The most widely used part of the Internet is the World Wide Web, often abbreviated "www" or simply referred to as just "the web". The web is an internet service that organizes information through the use of hypermedia. Typically, HTML (HTML=HyperText Markup Language) is used to specify the contents and format of a hypermedia document, such as a web page. A HTML file is a file that contains the source code for a particular web page. A web page is the image or collection of images that is displayed to a user when a particular HTML file is rendered by a browser application program.

Through the use of the web, individuals have access to millions of pages of information. Search engines have been developed to support users to locate the particular pages that contain the information that is of interest to them. Search engines index a large number of web pages and to provide an interface that can be used to search the indexed information by entering certain words or phases to be queried. These search terms are often referred to as "keywords".

Indexes used by search engines usually comprise an ordered list of information accompanied with the location of the information. An "index word set" of a document is the set of words that are mapped to the document, in an index. For example, an index word set of a web page is the set of words that are mapped to the web page, in an index. For documents that are not indexed, the index word set is empty.

Although there are many popular internet search engines, they are generally constructed using the same three common parts. First, each search engine has at least one, but typically more, "WebCrawler" function—also commonly referred to as "crawler", "spider", "robot"—that "crawls" across the internet in a methodical and automated manner to locate web documents around the world. Upon locating a document, the WebCrawler function stores the document's URL, and follows any hyperlinks associated with the document to locate other web documents. Second, each search engine contains an indexing mechanism that indexes certain information about the documents that were located by the WebCrawler function. In general, index information is generated based on the contents of the HTML file associated with the document. The indexing mechanism stores the index information in large databases that can typically hold an enormous amount of information. Third, each search engine provides a search tool that allows users, through a user interface, to search the databases in order to locate specific documents, and their location on the web (e.g., a URL), that contain information that is of interest to them.

Figure 1:
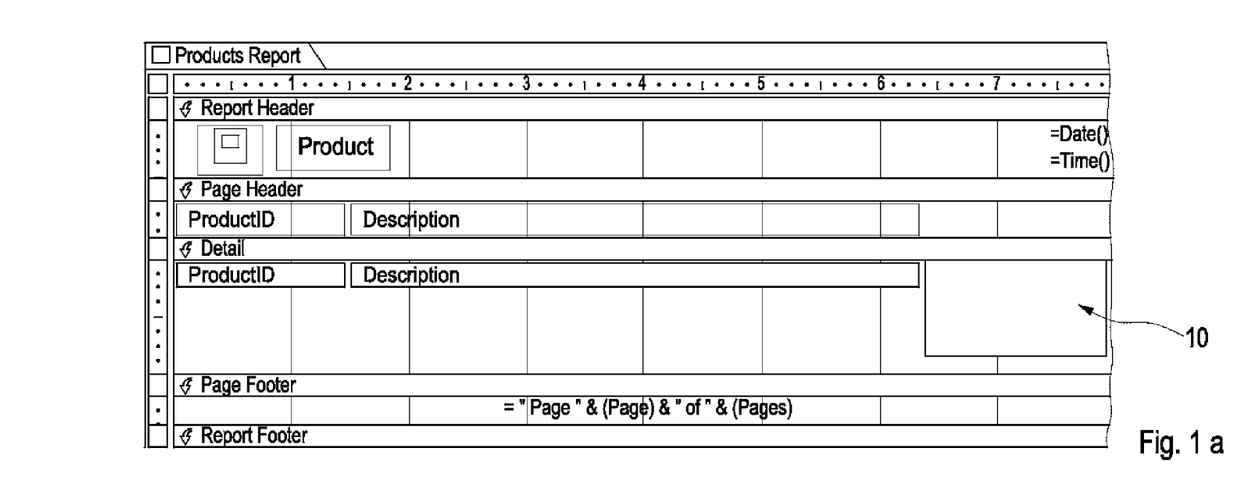
FIG. 1a-1c provide steps of an example embodiment of displaying an image together with a product description in an application.
Figure 1C:
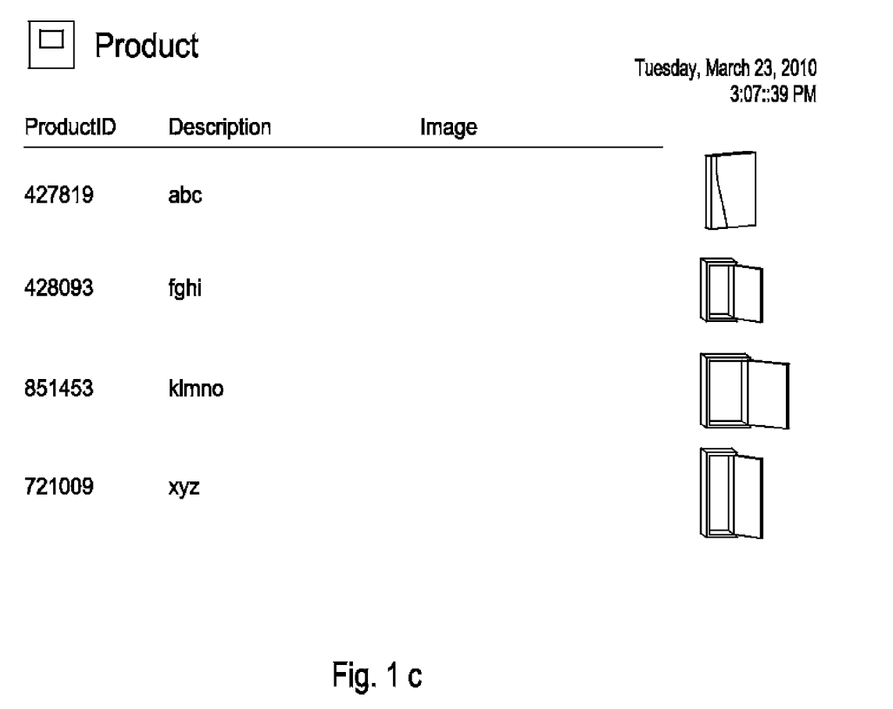

By way of example, as shown in FIGS. 1a-1c, in a specific instance of an example embodiment of the invention a Microsoft Access Report of Products contains a GUI form image control (FIG. 1a). The image 10 displayed resides in a locally accessible file; i.e., on the local file system: c:\ibm-logo.gif.

One goal in this example embodiment is to display an image along with a product description. There are thousands of products and storing each product image locally is not feasible—especially as the list of products may change. However, images for the products do exist on the internet. If such images can be located, they can be downloaded and displayed together with the product description.

The image control of the GUI has a control Source with a control source property which contains the name of the image file to load (shown at reference numeral 12). The control can invoke a visual-basic function to provide the name of the image file, as shown in FIG. 1b.

This instance according to this example embodiment of the invention provides a function; e.g., "LoadPicture( )" (shown at 12 in FIG. 1b) that not only computes a name of a file. The instance crawls the internet with a WebCrawler function looking for an image which can be associated with the computed name of the file and stores the respective image file on the locally accessible disk storage. In case there are more image files which can be associated with the file name, the WebCrawler would have to choose one based on some rule, e.g. first found, largest, random selection or the like, or could build a composite image from the set and store it in the respective image file.

The image can reside at a known location whereby the URL formed by LoadPicture( ) results in a unique definitive answer. The image file may reside at an unknown location and require the WebCrawler function to scan the internet. In case there is no image file in the web the GUI continues to show a place-holder with no picture, or a message "image not found" or the like, depending on the implementation of the file based image control. Optionally, a possibility would be for the WebCrawler to store a generic image into the respective image file. By way of example, a search engine such as google.com, bing.com, amazon.com, . . . , can be used. The WebCrawler function can interact with any variety of servers accessible on the network including but not limited to http servers serving html, web-services servers, ftp servers, remote file system servers, etc.

Figure 2A:
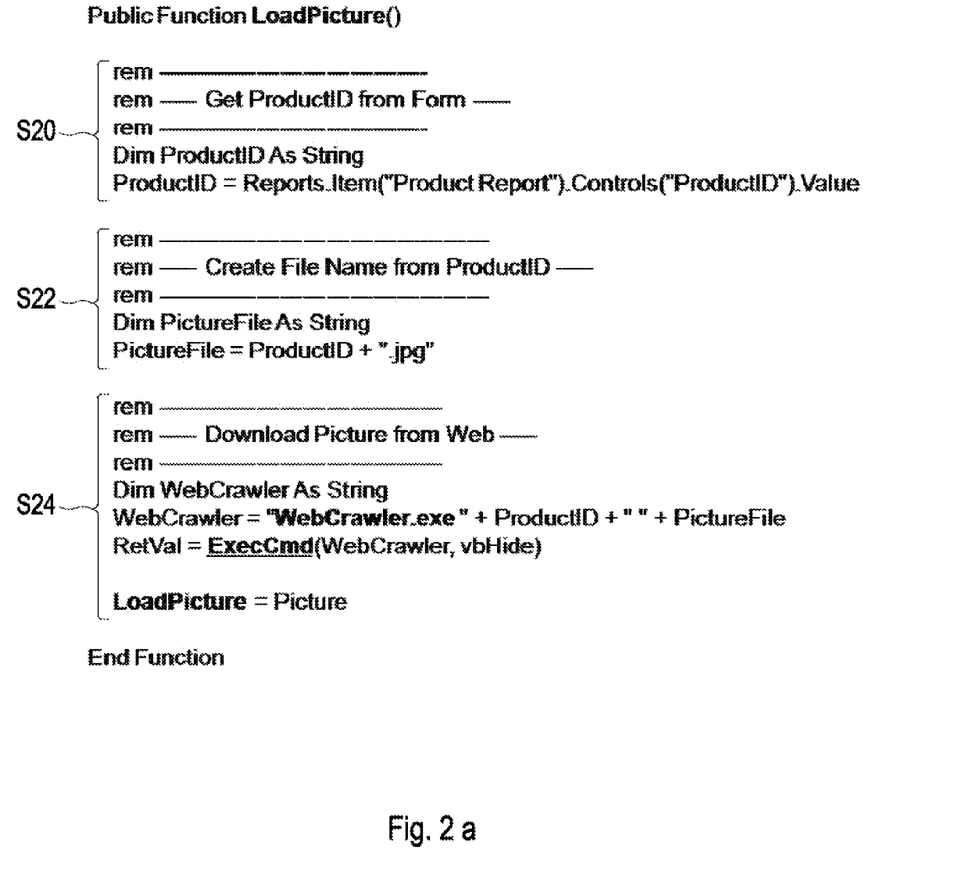
FIG. 2a-2c provide example embodiments of a visual basic routine in Microsoft Access.
Figure 2B:
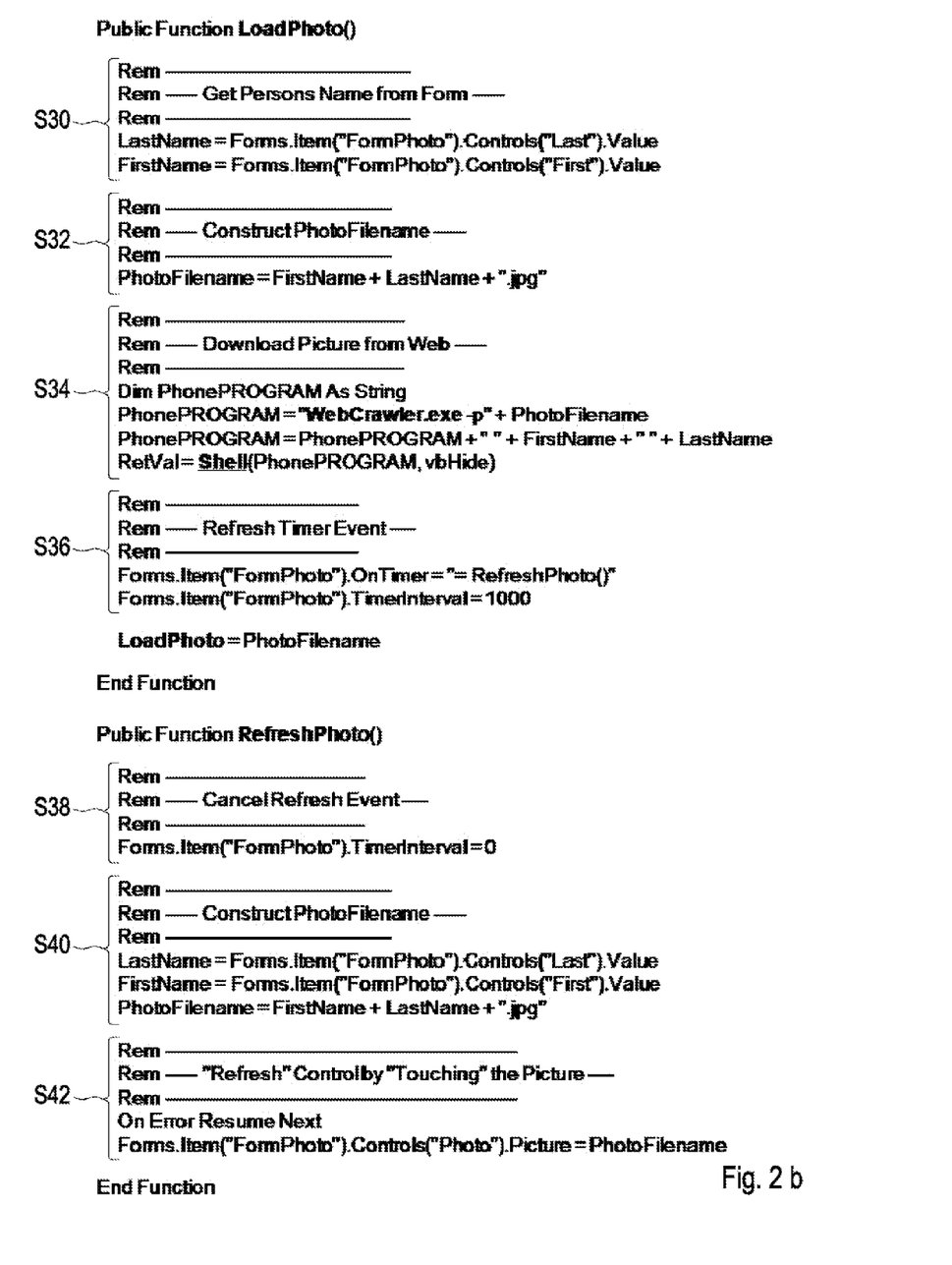
Figure 2C:
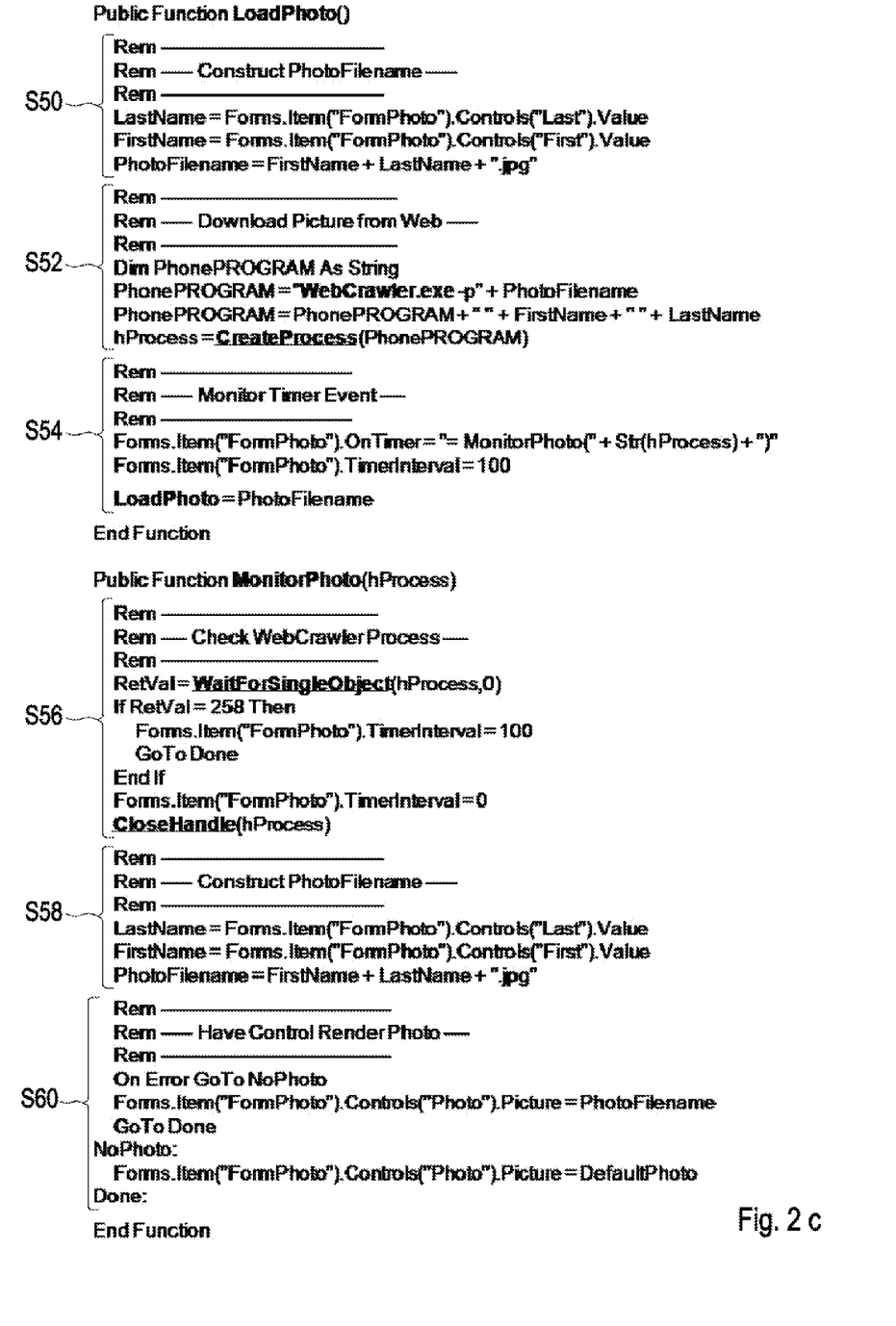

Example embodiments of a visual basic routine; e.g., in Microsoft Access, are presented in FIGS. 2a-2c.

A first example embodiment of the visual basic routine is displayed in FIG. 2a. In a first step S20, a product identification ProductID is retrieved from a form. Particularly, a GUI form may be understood as a canvas upon which GUI elements can be placed. A GUI element could be for instance "Text", "Buttons" "Input Fields" and other "controls" that accept user input or render output. In a subsequent step S22, a file name is created from the product identification ProductID. In step S24, an image is downloaded from the web. The ExecCmd function is a synchronous version of the native Microsoft Access Visual basic function Shell. The function ExecCmd is defined as a sequence of calls to windows kernel32 APIs CreateProcess and WaitForSingleObject. The definition is available in the Microsoft Access online help.

Another more complex example embodiment of the visual basic routine is displayed in FIG. 2b, demonstrating scheduling an asynchronous render event to update the file based GUI Image or data control. In a first step S30, a person's name is retrieved from a form. In subsequent step S32, a photo filename is constructed. In subsequent step S34, an image file with a picture associated with the photo file name is downloaded from the web. In subsequent step S36 a timer event is refreshed. Expediently, this schedules the subroutine "RefreshPhoto( )" to be called in 1000 ms (1 second) to render the picture—assuming the WebCrawler is finished in the time period of one second.

The content of the downloaded image file can be refreshed in a following visual basic routine. In step S38, a refresh event is cancelled. In subsequent step S40, a photo filename is constructed. In subsequent step S42, a refresh control by touching the displayed picture is performed. Expediently, by setting the "Picture" property of the control with the downloaded "Filename" the control is "told" to render the picture.

The visual basic routine in FIG. 2c illustrates scheduling an asynchronous process monitor to determine when the WebCrawler function ("WebCrawler") is complete and signal an event to update the file based GUI Image control or data control. In step S50, a photo filename is constructed. In subsequent step S52, an image file with the picture associated with the photo filename is downloaded from the web. In subsequent step S54, a timer event is scheduled to start monitoring the WebCrawler; e.g., The subroutine "MonitorPhoto( )" is scheduled to be called in 100 ms.

In step S56, the WebCrawler process can be checked: If the WebCrawler process is still active, the "MonitorPhoto( )" subroutine is scheduled to be called again in 100 ms (polling); otherwise: In subsequent step S58, the photo filename can be constructed. In subsequent step S60, a control renders the photo.

Note that the low-level processes CreateProcess API in step S52 and the WaitForSingleObject and CloseHandle APIs in step S56 are calls into the Windows kernel32—they are not native Visual Basic APIs.

Figure 3:
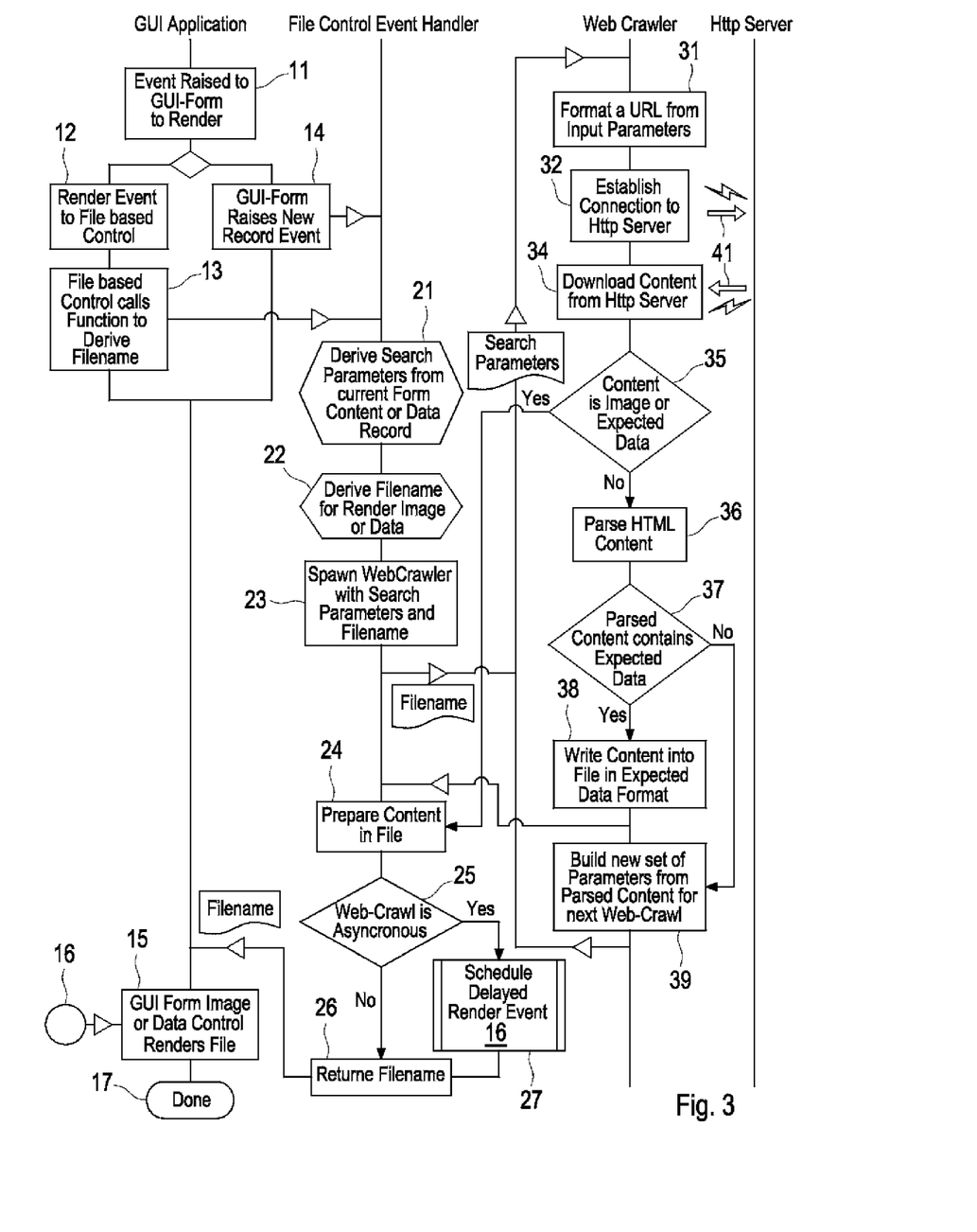
FIG. 3 provides a flow chart of a web-crawled content for a file based GUI form control according to an example embodiment of the invention.
Figure 4:
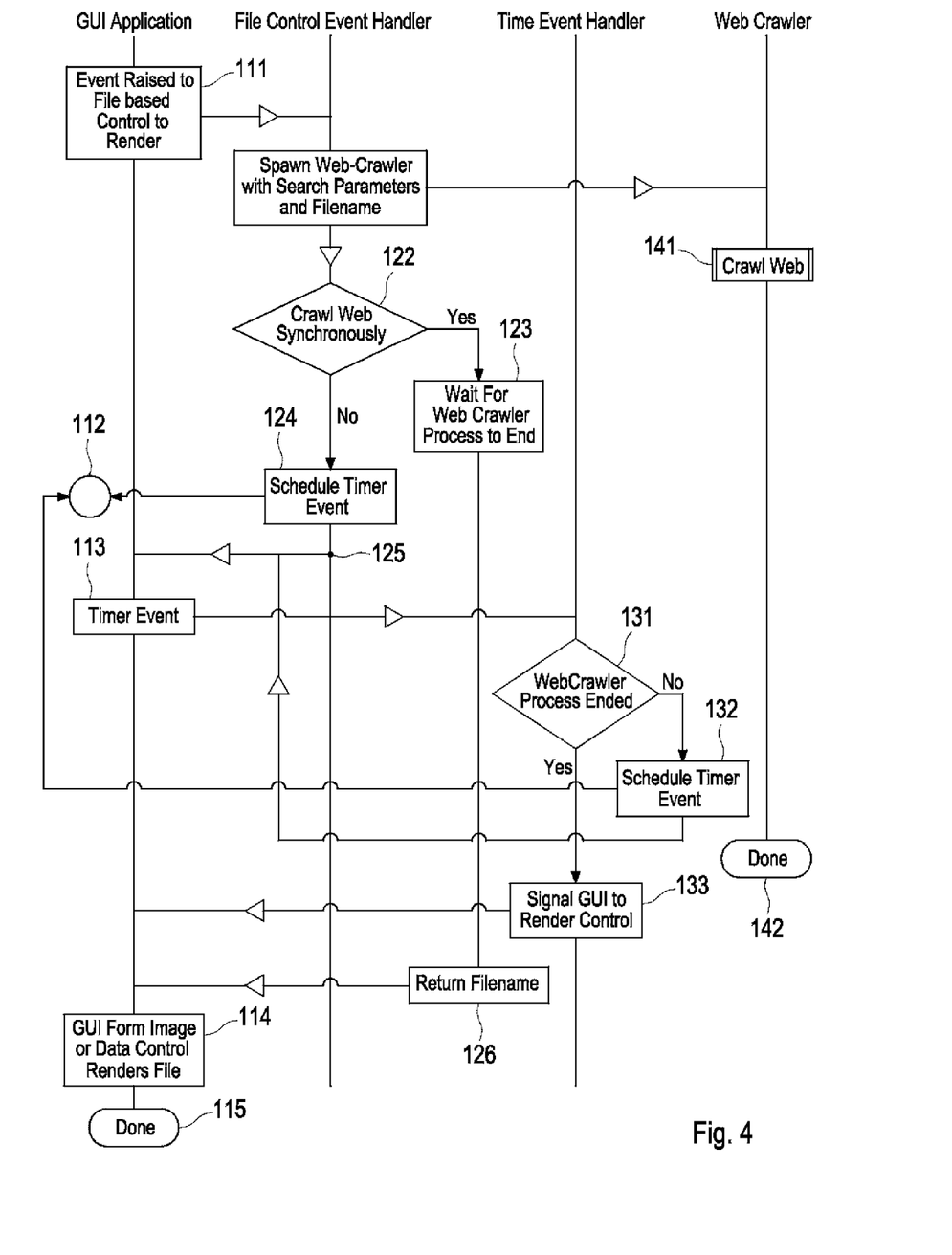
FIG. 4 provides a flow chart of an asynchronous web-crawled content for GUI control handling according to an example embodiment of the invention.

The flowcharts shown in FIGS. 3 and 4 describe the innerworkings of the invention in detail. In summary, the invention may include the steps of trapping a filename request, file read request, or render event of a file based GUI image or data control; initiating a WebCrawler function ("WebCrawler") with parameters derived from the current environment to retrieve data from the web; generating a locally accessible file with web content in a format interpretable by the file based GUI image or data control; having the file based GUI image or data control render the web content.

Having the file based GUI image or data control render the web content may include one of the following methods: (a) after the WebCrawler is complete, the process control is synchronously returned back to the GUI control to have it render the file; (b) schedule a timed asynchronous request to have the GUI control rendered after specific period of time; (c) asynchronously monitor whether the WebCrawler has completed and subsequently request to have the GUI control rendered.

FIG. 3 displays a flow chart of a web-crawled content for a file based GUI form control according to an example embodiment of the invention.

A GUI application initiates a GUI form (or a graphical report) to be displayed. An event is raised to the GUI form to render itself in step 11.

Depending on the type of the file-based GUI image or data control, a WebCrawler can be started from either an event directed to the control itself in step 12, or from the event directed to the parent form in step 14.

In the former case, the event could also be in the form of a call by the control to acquire the file name (step 13) (for example the name of an image residing on disk). In the latter case, the form event could be of the type caused when a new data record enters the form (e.g., "OnCurrent" record event).

The process control is passed to the associated Event Handler function. The Event Handler function derives parameters to be passed to the WebCrawler from current form content or the current data record (step 21). The Event Handler function also constructs a destination filename to designate a file on a locally accessible file-system for the WebCrawler to store the retrieved content (step 22).

The EventHandler function spawns a WebCrawler passing to it the parameters and destination filename (step 23) derived previously.

The process control is passed to the WebCrawler which operates in a search and seek loop comprising seven stages: (1) On begin of the WebCrawler loop, the WebCrawler formats a universal resource locator (URL) from input parameters that were handed to it from the Event Handler function (step 31). The URL may point to an internet server that is known to posses the desired content, or the URL may point to a generic search engine.

(2) The WebCrawler establishes a connection over the network to the HTTP server identified in the URL (step 32). The WebCrawler negotiates with HTTP server and requests the content identified by the remaining portion of the URL (step 33). The HTTP server sends the content back to the WebCrawler (step 44).

(3) If the content that WebCrawler requested is the image or expected data that the file based GUI form control can render, the process control is passed back to the Event Handler function (step 35).

(4) Otherwise the downloaded html content is parsed (step 36).

(5) If the parsed content contains the expected data that the file based GUI form control can render (checked in step 37), the expected data content is formatted into the expected format (step 38) and the process control is passed back to the Event Handler function.

(6) Otherwise a new set of input parameters is derived from the parsed content.

(7) The procedure jumps back to continue at the beginning of the WebCrawler loop.

After this, content from the WebCrawler is prepared for rendering by the GUI image or data control (step 24).

Depending on whether the WebCrawler operates asynchronously, the file based GUI form control may require that rendering occur asynchronously (step 25). By asynchronous, it does not mean that the rendering itself is asynchronous, it means the rendering is scheduled at a later time so the GUI does not "freeze"; i.e., does not wait for the WebCrawler to finish. If this is the case, the Event Handler function can schedule a timer event in step 27 (timer 16). Expediently, if the WebCrawler requires a significant amount of time it should run asynchronously. In this case, the GUI image or data control cannot render the data synchronously when control returns from the Event Handler function to the GUI application.

The derived filename is returned as the process control is returned to the GUI application, and passing back the filename if necessary, in step 25.

The GUI image or data control renders image or data (step 15). This may happen synchronously when control was returned from the Event Handler function or may happen asynchronously when an Event Handler associated with timer 16 (scheduled by step 27) issues a render event to the GUI image or data control. The process is complete in step 17.

FIG. 4 shows a flow chart of an asynchronous web-crawled content for GUI control handling according to another example embodiment of the invention. The Figure shows a WebCrawler initiated synchronously in the manner of FIG. 3 but which crawls the web asynchronously. The Figure further shows how the asynchronously acquired data is rendered.

Event driven GUI based applications are not designed to be able to wait extensive periods for a control to render itself. For instance, an "extensive period" may be any time longer than a few hundreds of milliseconds. A WebCrawler, on the other hand, may require a longer period to acquire and format web content for the file based GUI control to render.

The GUI application initiates the file based GUI form control to render in step 111 (corresponding to FIG. 3 steps 11 through 14).

The process control is passed to the file control Event Handler, which initiates a WebCrawler with search parameters and a filename (step 121), corresponding to steps 21 through 23 in FIG. 3.

The WebCrawler operates asynchronously (step 141), corresponding to steps 31 through 39 in FIG. 3.

If the WebCrawler should operate in a semantically synchronous manner (determined in step 122), the file control Event Handler would wait for the WebCrawler to complete (step 123). The process control would subsequently be returned to the GUI application (step 126). Otherwise, a timer event 112 is scheduled to the GUI application (step 124) and the process control is returned to the GUI (step 125). A typical time may be in the order of 100 ms, sufficiently small so the user does not notice of a delay in rendering, and sufficiently large as not to use many CPU cycles.

At the time event 112, process control is passed to the timer Event Handler. The timer Event Handler determines whether the WebCrawler process as completed (step 131). If the WebCrawler process has not completed, another timer event 112 is scheduled to the GUI application and control is returned to the GUI application (step 132). Otherwise, the WebCrawler is completed so the GUI or file based GUI control is signaled to render the control and the process control is returned to the GUI application (step 133).

The GUI image or data control renders image or data (step 114). The process is complete in step 115.

Figure 5:
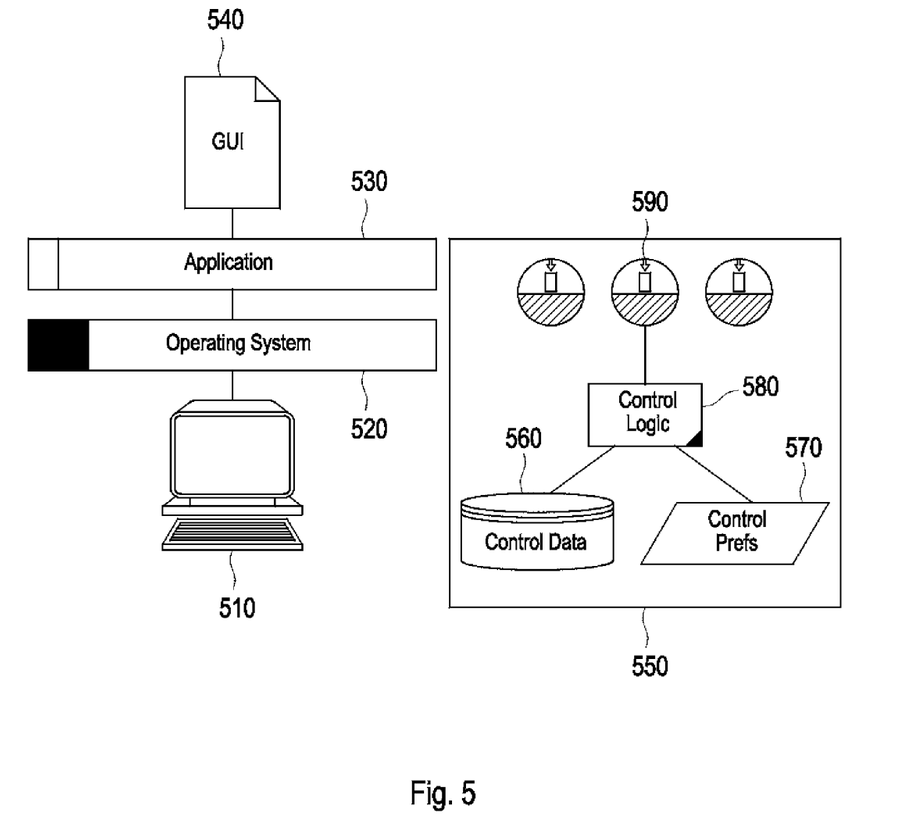
FIG. 5 provides a block diagram illustrating a data processing system configured to dynamically display graphical content.

In further illustration, FIG. 5 is a block diagram illustrating a data processing system configured to rendering dynamic web content with a static file based GUI form controls with a WebCrawler. As shown in the Figure, the data processing system can include a host computing platform 510 including an operating system 520. The operating system 530 can host an application 530 providing a GUI 540. Notably, the operating system 520 can be coupled to a resource defining a user interface control group 550. Implementations of the user interface control group 550 can be rendered within the GUI 540 for the application 530.

The user interface control group 550 can include a set of user interface controls 590 managed by control logic 580. The control logic 580 can be coupled to both control data 560 and control preferences 570.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-RAY) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code which must be retrieved from bulk storage during execution.

Input/output or I/O-devices (including, but not limited to keyboards, displays, pointing devices, etc.) can be coupled to the system either directly or through intervening I/O controllers.

Network adapters may also be coupled to the system to enable the data processing system or remote printers or storage devices through intervening private or public networks. Modems, cable modem and Ethernet cards are just a few of the currently available types of network adapters.

The invention claimed is:

1. A method for rendering dynamic web contents with static file based graphical user interface (GUI) form control, comprising the steps of:
   trapping an event which requires to draw or redraw an image in a file based GUI image control in a current local environment;
   initiating a WebCrawler function with parameters derived from the current local environment to retrieve data from the web;
   generating a locally accessible file with web content in a format interpretable by the file based GUI image control; and
   having the file based GUI image control render the web content contained in the locally accessible file.

2. The method according to claim 1, wherein the event comprises at least one event chosen from the group consisting of:
   trapping a filename request related to a rendering event of the file based GUI image control;
   trapping a before-render-event of a file based GUI image control; and
   trapping a before render-event of the form hosting a file based GUI image control.

3. The method according to claim 1, wherein, after the WebCrawler function is completed, synchronously returning process control back to the GUI control to have it render the file.

4. The method according to claim 1, further comprising the step of:
   scheduling a timed asynchronous request to have the GUI control rendered after a specific period of time.

5. The method according to claim 1, further comprising the step of:
   asynchronously monitoring whether the WebCrawler function is completed and subsequently request to have the GUI control rendered.

6. The method according to claim 5, further comprising the step of:
   requesting to have the GUI control rendered.

7. A computer program product for rendering dynamic web content with static file based graphical user interface (GUI) form control, the computer program product comprising a non-transitory computer readable storage medium having program instructions embodied therewith, the program instructions executable by a computer to cause the computer to perform the method of:
   trapping an event which requires to draw or redraw an image in a file based GUI image control in a current local environment;
   initiating WebCrawler function with parameters derived from the current environment to retrieve data from the web;
   generating a locally accessible file with web content in a format interpretable by the file based GUI image control; and
   having the file based GUI image control render the web content contained in the locally accessible file.

* * * * *